(12) United States Patent
Okamura

(10) Patent No.: US 11,195,071 B2
(45) Date of Patent: Dec. 7, 2021

(54) IMAGE FORMING APPARATUS, OUTPUT STATE IMAGE GENERATION METHOD, AND COMPUTER-READABLE MEDIUM

(71) Applicant: Takao Okamura, Tokyo (JP)

(72) Inventor: Takao Okamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/739,300

(22) Filed: Jan. 10, 2020

(65) Prior Publication Data

US 2020/0234093 A1 Jul. 23, 2020

(30) Foreign Application Priority Data

Jan. 23, 2019 (JP) .............................. JP2019-009667

(51) Int. Cl.
*G06K 15/02* (2006.01)
(52) U.S. Cl.
CPC ....... *G06K 15/1885* (2013.01); *G06K 15/025* (2013.01)
(58) Field of Classification Search
None
See application file for complete search history.

(56) References Cited

U.S. PATENT DOCUMENTS

| 2005/0243372 | A1* | 11/2005 | Sato | ...................... G06F 3/1284 |
| | | | | 358/1.18 |
| 2005/0286923 | A1* | 12/2005 | Kim | ...................... G03G 15/50 |
| | | | | 399/75 |
| 2015/0117890 | A1* | 4/2015 | Yamada | ............. G03G 15/5016 |
| | | | | 399/81 |
| 2017/0223225 | A1* | 8/2017 | Kaneda | ................ H04N 1/2323 |

FOREIGN PATENT DOCUMENTS

| JP | 2003-296090 | 10/2003 |
| JP | 2010-118763 | 5/2010 |
| JP | 2014-048826 | 3/2014 |

* cited by examiner

*Primary Examiner* — Lennin R Rodriguezgonzalez
(74) *Attorney, Agent, or Firm* — Harness, Dickey & Pierce, P.L.C

(57) ABSTRACT

An image forming apparatus is configured to form and output a printed material obtained by printing image information on a printing medium. The image forming apparatus includes processing circuitry configured to acquire designation information for designating an output state of the image information; detect orientation in which the printed material is to be output, and form an output state image based on the detected orientation in which the printed material is to be output and the designation information, the output state image representing an output state of the printed material and being to be displayed on a display.

8 Claims, 9 Drawing Sheets

IMAGE FORMING APPARATUS, OUTPUT STATE IMAGE GENERATION METHOD, AND COMPUTER-READABLE MEDIUM

CROSS-REFERENCE TO RELATED APPLICATIONS

The present application claims priority under 35 U.S.C. § 119 to Japanese Patent Application No. 2019-009667, filed on Jan. 23, 2019. The contents of which are incorporated herein by reference in their entirety.

BACKGROUND OF THE INVENTION

1. Field of the Invention

The present invention relates to an image forming apparatus, an output state image generation method, and a computer-readable medium.

2. Description of the Related Art

In recent years, image forming apparatuses, such as a copier, a scanner, a printer, and a multifunction peripheral (MFP) having a plurality of image forming functions, have been known. In the image forming apparatuses as described above, it is desirable to output a printed material in a state as imagined by a user.

Japanese Unexamined Patent Application Publication No. 2003-296090 discloses an image forming apparatus that can check a post-processed state before actual printing. The image forming apparatus forms an expected completed image of recording paper on the basis of post-processed image data that represents a state of a printed material subjected to post-processing, such as a stapling process, a saddle stitching process, and a punching process, and on the basis of print data to be printed on the recording paper, and displays a preview on a display device. Accordingly, it is possible to check, on a display screen, a state of the printed material subjected to the post-processing before performing actual printing, so that it is possible to prevent a problem with a post-processing position.

However, the image forming apparatus disclosed in Japanese Unexamined Patent Application Publication No. 2003-296090 has a problem in that a "printed material output orientation" that is determined based on a side to be output at a leading end at the time of output among a top side, a bottom side, a right longitudinal side, and a left longitudinal side of a rectangular printed matter is not known until the printed material is actually output. Therefore, the image forming apparatus disclosed in Japanese Unexamined Patent Application Publication No. 2003-296090 often leads to inconvenience that the printed material is not output in a state as imagined by a user.

SUMMARY OF THE INVENTION

According to an aspect of the present invention, an image forming apparatus is configured to form and output a printed material obtained by printing image information on a printing medium. The image forming apparatus includes processing circuitry configured to acquire designation information for designating an output state of the image information; detect orientation in which the printed material is to be output, and form an output state image based on the detected orientation in which the printed material is to be output and the designation information, the output state image representing an output state of the printed material and being to be displayed on a display.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
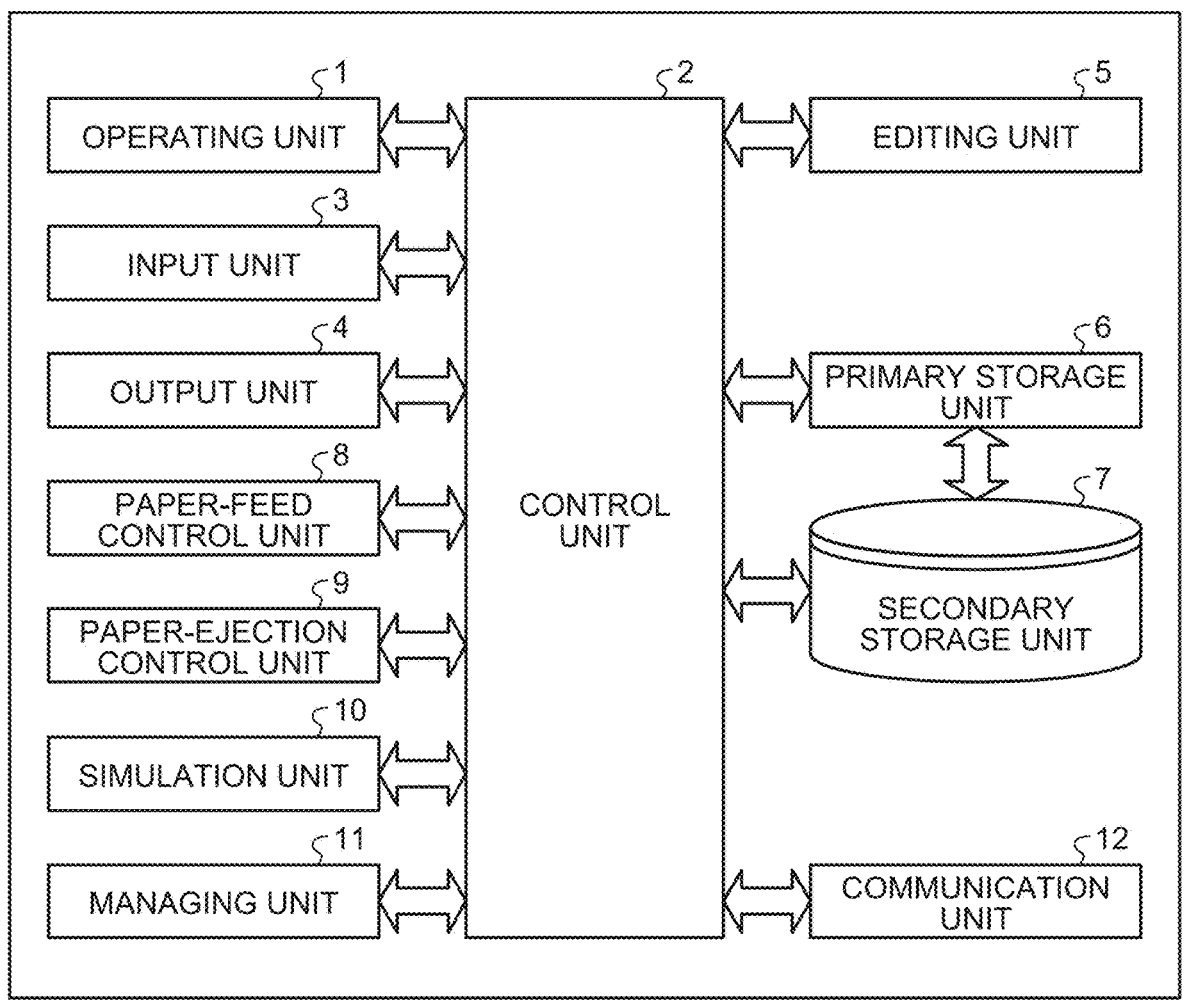
FIG. 1 is a block diagram of an MFP according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings. An embodiment has an object to provide an image forming apparatus, an output state image generation method, and a computer-readable recording medium capable of outputting a printed material in a state as imagined by a user.

A multifunction peripheral (MFP) as one embodiment of an image forming apparatus, an output state image generation method, and a computer-readable recording medium will be described below with reference to the accompanying drawings.

System Configuration

FIG. 1 is a block diagram of an MFP according to an embodiment. As illustrated in FIG. 1, the MFP includes an operating unit 1, a control unit 2, an input unit 3, an output unit 4, an editing unit 5, a primary storage unit 6, a secondary storage unit 7, a paper-feed control unit 8, a paper-ejection control unit 9, a simulation unit 10, a managing unit 11, and a communication unit 12.

The input unit 3 acquires image data and electronic data that are input. The output unit 4 outputs image data and electronic data. The editing unit 5 performs image editing. The primary storage unit 6 and the secondary storage unit 7 store therein data. The paper-feed control unit 8 takes in set paper at the time of output. The paper-ejection control unit 9 ejects the set paper at the time of output, and controls a paper ejection apparatus that performs physical processing on the paper.

The simulation unit 10 integrates input data, output data, an edit request, information on designated paper feed control, information on designated paper ejection control, performance information on inside of the MFP acquired by the managing unit 11, performance information on optional apparatuses acquired by the managing unit 11, and the like, and forms a still image or a moving image to be used as a preview of a printed material. The managing unit 11 manages performance or specifications of connected optional apparatuses and the own MFP. The communication unit 12 communicates with external apparatuses via a predetermined network, such as the Internet or a local area network (LAN).

Hardware Configuration

Figure 2:
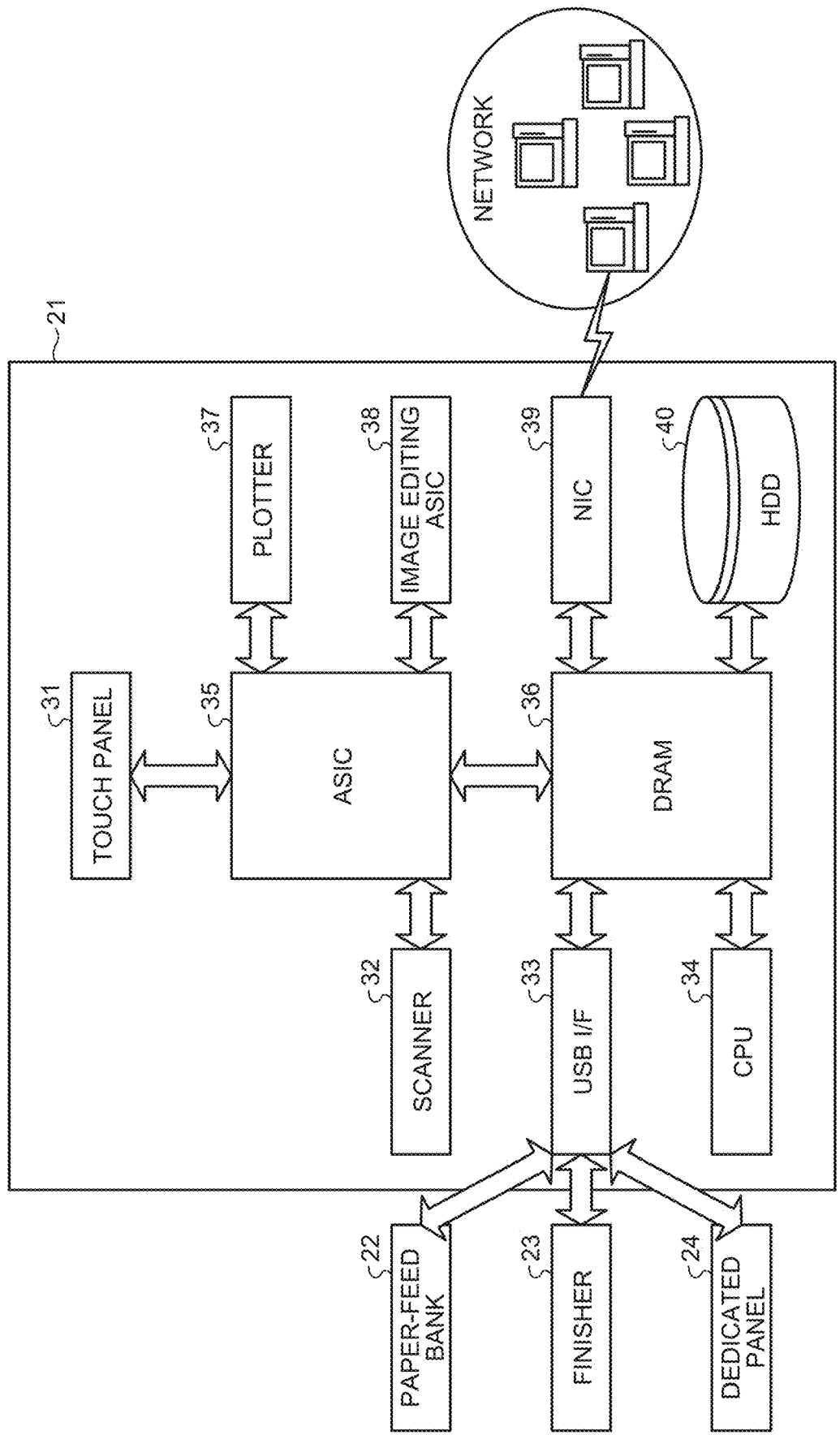
FIG. 2 is a hardware configuration diagram of the MFP according to the embodiment.

FIG. 2 is a hardware configuration diagram of the MFP according to the embodiment. As illustrated in FIG. 2, the MFP includes a main body 21, a paper-feed bank 22, a finisher 23, and a dedicated panel 24. The main body 21 includes a touch panel 31, a scanner mechanism 32, a universal serial bus (USB) interface (USB I/F) 33, a central processing unit (CPU) 34, an application specific integrated circuit (ASIC) 35, a dynamic random access memory (DRAM) 36, a plotter mechanism 37, an image editing ASIC 38, a network interface card (NIC) 39, and a hard disk drive (HDD) 40.

The operating unit 1 illustrated in FIG. 1 corresponds to the touch panel 31, and performs data input, operation setting, and display of an execution result. The control unit 2 illustrated in FIG. 1 controls the CPU 34 and the ASIC 35 and performs various processes. The input unit 3 illustrated in FIG. 1 performs image input processes using an auto document feeder (ADF) of the scanner mechanism 32 and using a pressure plate.

The output unit 4 illustrated in FIG. 1 outputs image data received from the plotter mechanism 37. The editing unit 5 illustrated in FIG. 1 processes image data in response to a request, by using the image editing ASIC 38. The primary storage unit 6 and the secondary storage unit 7 illustrated in FIG. 1 perform primary storage using the DRAM 36 and secondary storage using the HDD 40, respectively. The communication unit 12 illustrated in FIG. 1 performs data communication with external apparatuses via a network by using the NIC 39, the CPU 34, and the DRAM 36.

The paper-feed control unit 8 illustrated in FIG. 1 communicates with the paper-feed bank 22 via the USB I/F 33 and controls paper feeding. The paper-ejection control unit 9 illustrated in FIG. 1 communicates with the finisher 23 via the USB I/F 33 and controls paper ejection. The managing unit 11 illustrated in FIG. 1 acquires apparatus information on the paper-feed bank 22 and apparatus information on the finisher 23 by communicating with the paper-feed bank 22 and the finisher 23 via the USB I/F 33, and performs apparatus information management. Further, the managing unit 11 illustrated in FIG. 1 acquires apparatus information and performance information by communicating with the dedicated panel 24 via the USB I/F 33, and performs apparatus information management. Furthermore, the managing unit 11 illustrated in FIG. 1 acquires and manages own-apparatus performance information.

The simulation unit 10 illustrated in FIG. 1 acquires a data input and an operation setting request from the touch panel 31 that corresponds to the operating unit 1. Further, the simulation unit 10 acquires read-in size information and orientation information on image data in the scanner mechanism 32 that corresponds to the input unit 3. Furthermore, the simulation unit 10 acquires information from the managing unit 11 that manages information on the paper-feed control unit 8 and the paper-ejection control unit 9. Moreover, the simulation unit 10 stores image data processed by the image editing ASIC 38 that corresponds to the editing unit 5 illustrated in FIG. 1 in the DRAM 36 that corresponds to the primary storage unit 6, the HDD 40 that corresponds to the secondary storage unit 7, and the like.

Then, the simulation unit 10 forms a still image or a moving image in which an output image is simulated based on a simulation process program (one example of an output state image generation program) that is stored in a storage unit, such as the DRAM 36 or the HDD 40, and displays the formed image on the touch panel 31.

Software Configuration

Figure 3:
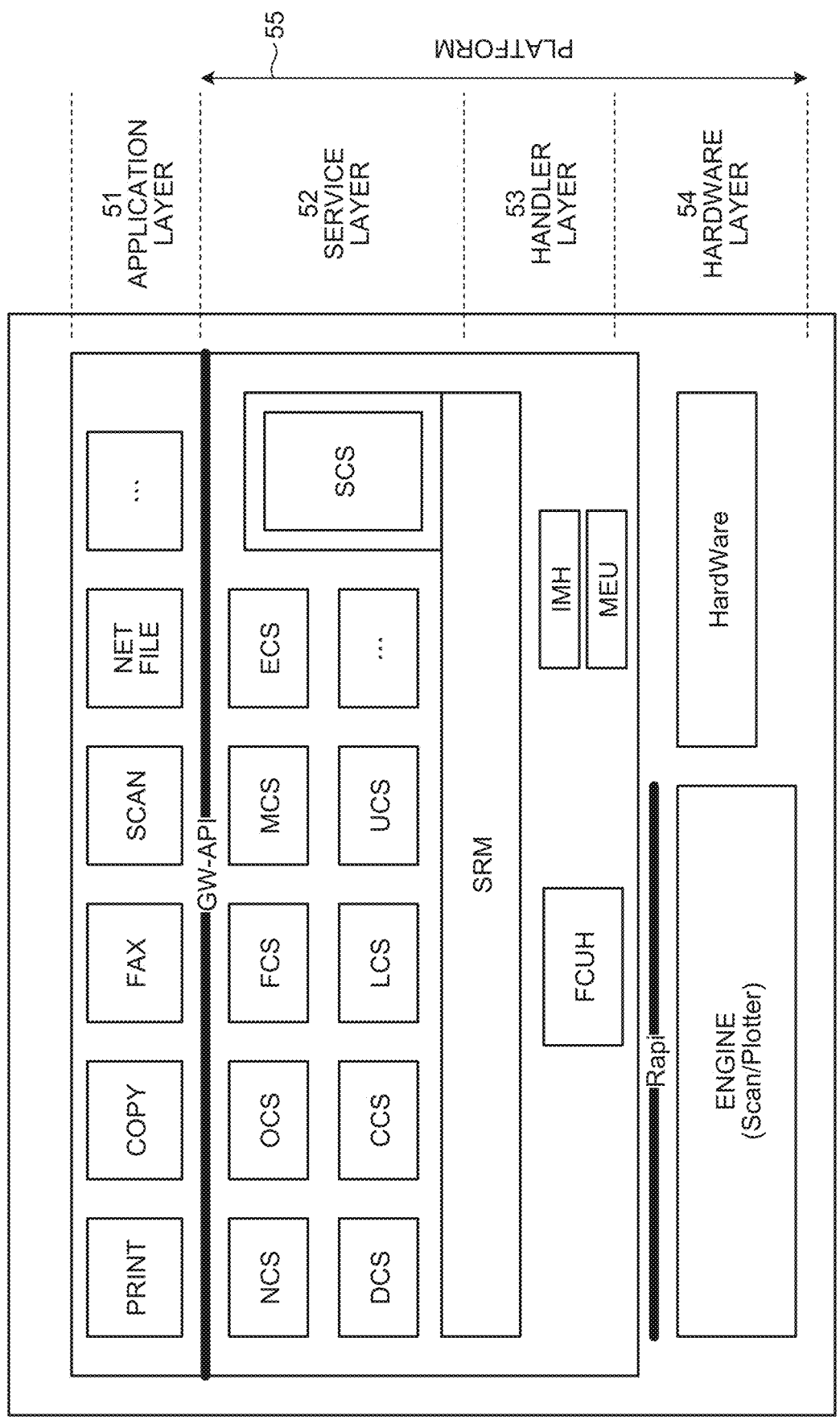
FIG. 3 is a diagram illustrating a software configuration of the MFP according to the embodiment.

FIG. 3 is a diagram illustrating a software configuration of the MFP. As one example, the MFP according to the embodiment includes, as the software configuration, an application layer 51, a service layer 52, a handler layer 53, and a hardware layer 54. The service layer 52, the handler layer 53, and the hardware layer 54 constitute a platform 55.

The application layer 51 includes various application programs, such as a print application program (PRINT), a copy application program (COPY), a facsimile application program (FAX), and a scan application program (SCAN). These application programs provide, to the platform 55, instructions or setting requests that are issued by a user via the operating unit 1. Accordingly, functions of the various applications are implemented.

The service layer 52 of the platform 55 includes a network control service (NCS), an operation control service (OCS), a facsimile control service (FCS), and a memory control service (MCS). Further, the service layer 52 of the platform 55 includes an engine control service (ECS), a delivery control service (DCS), a certificate control service (CCS), a user control service (UCS), a system control service (SCS), and the like.

The service layer 52 as described above controls an input function, an output function, a user authentication function, an electronic embedding function, an electronic embedding detection function, an external communication function, and the like of the MFP according to the embodiment.

The handler layer 53 includes a system resource manager (SRM), a facsimile control utility handler (FCUH), an image memory handler (IMH), a media edit utility (MEU), and the like. The handler layer 53 controls data write (storage) and data read with respect to the DRAM 36 that corresponds to the primary storage unit 6 and the HDD 40 that corresponds to the secondary storage unit 7. Further, the handler layer 53 controls other hardware apparatuses that belong to the hardware layer 54.

The hardware layer 54 is connected to the handler layer 53 via Rapi (peripheral component interconnect (PCI)). The hardware layer 54 controls an engine apparatus (a scanner mechanism (Scan), a plotter mechanism (Plotter), or the like) and performs input and output of image data. Further, the hardware layer 54 controls other hardware apparatuses (HardWare) and communicates with external apparatuses.

Functions of MFP

Figure 4:
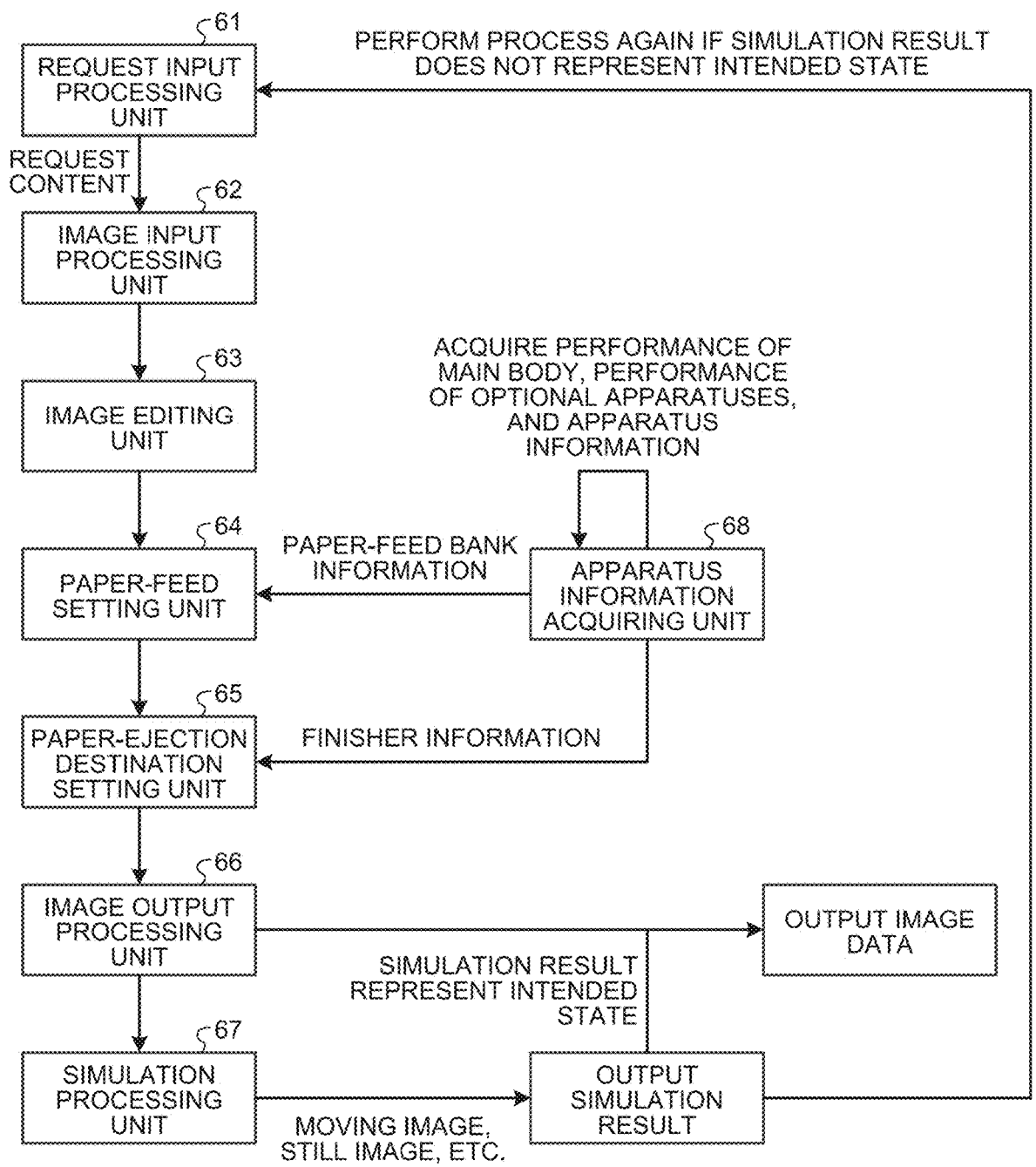
FIG. 4 is a functional block diagram of the MFP according to the embodiment.

In the MFP according to the embodiment, by mainly causing the CPU 34 to execute the simulation process program that is stored in the storage unit, such as the DRAM 36 or the HDD 40, each of functions as illustrated in FIG. 4 is implemented. Specifically, the CPU 34 executes the simulation process program and implements each of functions of a request input processing unit 61, an image input processing unit 62, an image editing unit 63, a paper-feed setting unit 64, a paper-ejection destination setting unit 65, an image output processing unit 66, a simulation processing unit 67, and an apparatus information acquiring unit 68.

The apparatus information acquiring unit 68 acquires information indicating performance of the main body of the own MFP, information indicating performance of connected optional apparatuses, and apparatus information, and stores the pieces of acquired information in a storage unit, such as the HDD 40. The request input processing unit 61 is one example of a designation information acquiring unit, and notifies the image input processing unit of a request content that is indicated by data input and setting input. The image input processing unit 62 performs, on image data, data processing that is indicated by the notified request content. Further, the image editing unit 63 performs an input process (an adding process or an editing process) for inputting a predetermined image, such as "date information", "page information", or "stamp", a symbol, a character, or the like on the image data. The "date information", the "page information", and the "stamp" are examples of additional print information. The additional print information as described above is included in the request content acquired by the request input processing unit 61.

The paper-feed setting unit 64 acquires paper-feed bank information from the apparatus information acquiring unit 68. The paper-ejection destination setting unit 65 acquires finisher information from the apparatus information acquiring unit 68. The image output processing unit 66 outputs image data or notifies the simulation processing unit 67 of a content of image data output control. The simulation processing unit 67 forms a still image or a moving image (simulation result) indicating an output state of a printed material on the basis of the above-described request content, paper that is selected from the apparatus information, and specification information, and displays the formed image on the touch panel 31. If the simulation result displayed on the touch panel 31 represents an intended output state, a user gives an instruction to output the printed material, and if the simulation result does not represent the intended output state, the user performs operation of changing setting or the like so as to realize the intended output state.

Operation of Simulation Process

Figure 5:
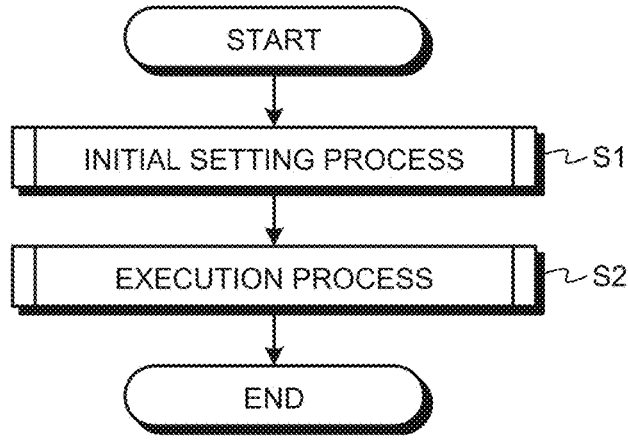
FIG. 5 is a flowchart illustrating the entire flow of operation of a simulation process performed by the MFP according to the embodiment for obtaining a printed material in an output state as intended by a user.

FIG. 5 is a flowchart illustrating the entire flow of operation of a simulation process performed by the MFP according to the embodiment for obtaining a printed material in an output state as intended by the user. As illustrated in the flowchart in FIG. 5, the simulation process includes an "initial setting process (Step S1)" and an "execution process (Step S2)". The initial setting process is a process of acquiring information indicating the performance of the main body of the own MFP, information indicating the performance of the connected optional apparatuses, and the apparatus information, and storing the pieces of information in the storage unit, such as the HDD 40. Further, the execution process is a simulation process of displaying an output state of a printed material on the basis of a processing request issued by the user and various kinds of acquired information.

Initial Setting Process

Figure 6:
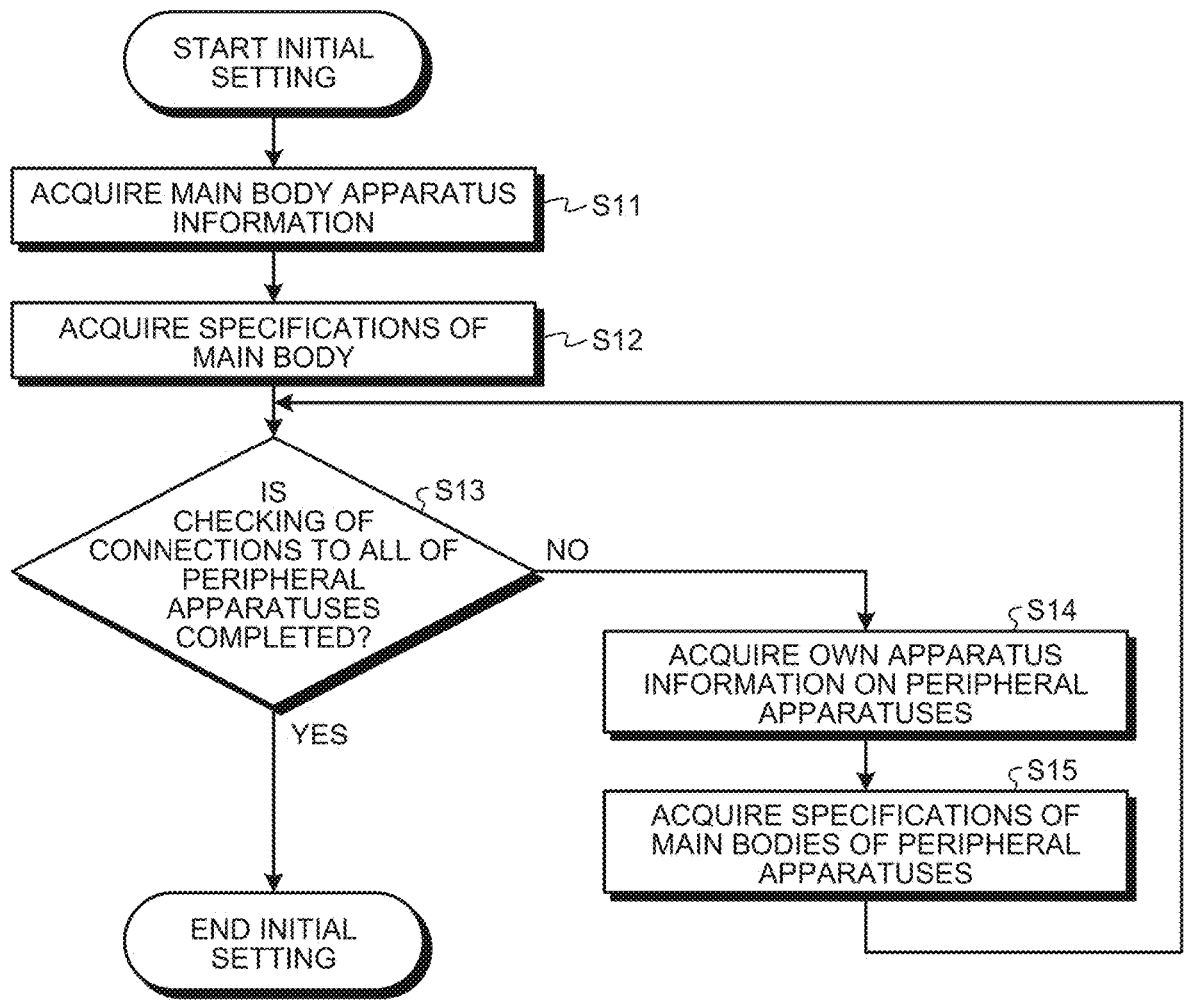
FIG. 6 is a flowchart illustrating the flow of an "initial setting process"

FIG. 6 is a flowchart illustrating the flow of the "initial setting process" at Step S1 as described above. The CPU 34 illustrated in FIG. 2 functions as each of the units 61 to 68 as illustrated in FIG. 4 on the basis of the simulation process program that is stored in the storage unit, such as the DRAM 36 or the HDD 40. First, at Step S11, the apparatus information acquiring unit 68 illustrated in FIG. 4 acquires main body apparatus information indicating the performance of the main body of the own MFP. Further, at Step S12, the apparatus information acquiring unit 68 acquires specification information on the main body 21 (main body specification).

Subsequently, at Step S13, the apparatus information acquiring unit 68 requests the paper-feed bank 22 and the finisher 23, which are connected as optional apparatuses (peripheral apparatuses) to the MFP, to transmit own apparatus information and specification information on main bodies (main body specifications). At Step S14 and Step S15, the paper-feed bank 22 and the finisher 23 transmit paper-feed bank information and finisher information as the own apparatus information and the specification information to the MFP.

At Step S13, the apparatus information acquiring unit 68 of the MFP determines whether the own apparatus information and the specification information are acquired from all of the peripheral apparatuses (checking of connections to the peripheral apparatuses). At Step S13, if the apparatus information acquiring unit 68 determines that checking of the connections to all of the peripheral apparatuses is completed (YES at Step S13), the process proceeds to the above-described execution process.

Execution Process

Figure 7:
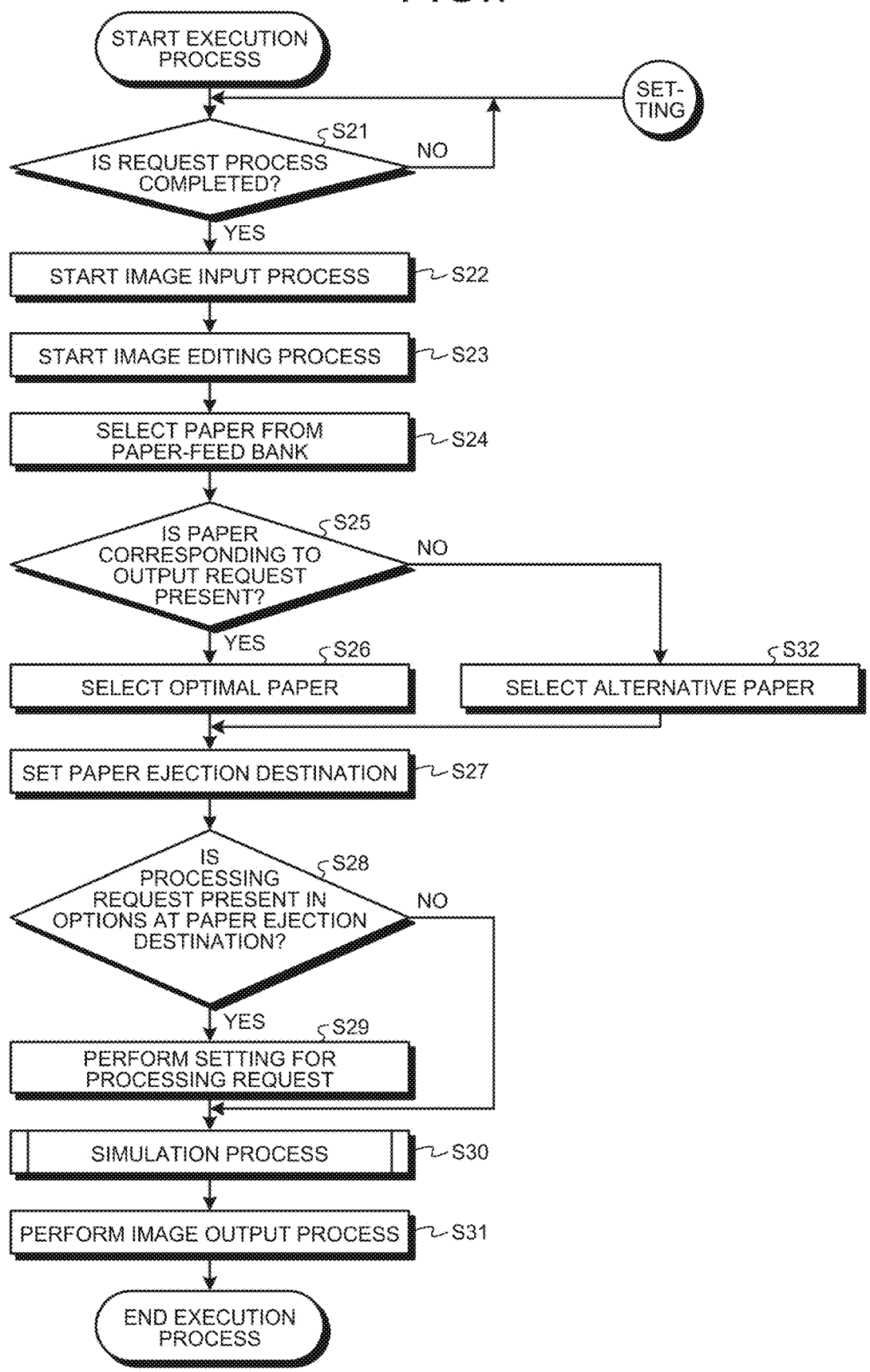
FIG. 7 is a flowchart illustrating the flow of an "execution process"

FIG. 7 is a flowchart illustrating the flow of the "execution process" at Step S2 as described above. At Step S21, the request input processing unit 61 illustrated in FIG. 4 acquires setting information that is set by the user. Further, at Step S21, if the output state of the printed material is not an output state as intended by the user in the simulation process that is to be described later with reference to FIG. 8, the request input processing unit 61 acquires resetting information that is re-set by the user. Then, at Step S21, the request input processing unit 61 determines whether a request process that is a process of acquiring the setting information or the resetting information as described above is completed (whether the setting information or the resetting information is acquired). If it is determined that the request process is completed (YES at Step S21), the request input processing unit 61 notifies the image input processing unit 62 of a setting content (request content) that is set by the user. Accordingly, the process proceeds to Step S22.

At Step S22, the image input processing unit 62 performs, on image data, data processing that is indicated by the notified request content. At Step S23, the image editing unit 63 performs the input process (the adding process or the editing process) of inputting a predetermined image, such as "date information" or "page information", a symbol, a character, or the like on the image data.

At Step S24, the paper-feed setting unit 64 selects paper on the basis of a paper size, orientation, and a type of the paper-feed bank 22, which are indicated by the paper-feed bank information acquired from the apparatus information acquiring unit 68. At Step S25, the paper-feed setting unit 64 determines whether paper corresponding to an output request is present. If the paper corresponding to the output request is present (YES at Step S25), the paper-feed setting unit 64 selects the paper corresponding to the output request (Step S26). If the paper corresponding to the output request is not present (NO at Step S25), the paper-feed setting unit 64 selects paper that can be an alternative of the paper indicated by the output request (Step S32).

Subsequently, the paper-ejection destination setting unit 65 sets a paper ejection destination corresponding to the request content on the basis of the finisher information acquired from the apparatus information acquiring unit 68 (Step S27). Further, the paper-ejection destination setting unit 65 determines whether a processing request is present in options at the paper ejection destination (Step S28). If the processing request issued by the user is present in the options at the paper ejection destination (YES at Step S28), the paper-ejection destination setting unit 65 performs setting for a requested processing process (Step S29). If the processing request issued by the user is not present in the options at the paper ejection destination (NO at Step S28), the paper-ejection destination setting unit 65 does not perform setting for a processing process, and the process proceeds to Step S30.

At Step S30, first, the image output processing unit 66 checks setting information before an image is output. Thereafter, the simulation processing unit 67 performs the simulation process to be described in detail below with reference to the flowchart in FIG. 8. Through the simulation process, a preview image (a still image or a moving image: one example of an output state image) that represents an output state of a printed material is displayed on the touch panel 31 that is one example of a display unit. The user views the preview image and recognizes the output state of the printed material. If the output state of the printed material is not the intended output state, the user performs resetting operation. Accordingly, as described above at Step S21, the resetting information is acquired by the request input processing unit 61.

In contrast, if the output state of the printed material is the intended output state, the user performs image output operation via the touch panel 31 (Step S31). Upon detecting the image output operation, the image output processing unit 66 performs a printed image output process. Accordingly, the printed material is output in the same output state as the output state that is displayed as the preview image.

Details of Simulation Process

Figure 8:
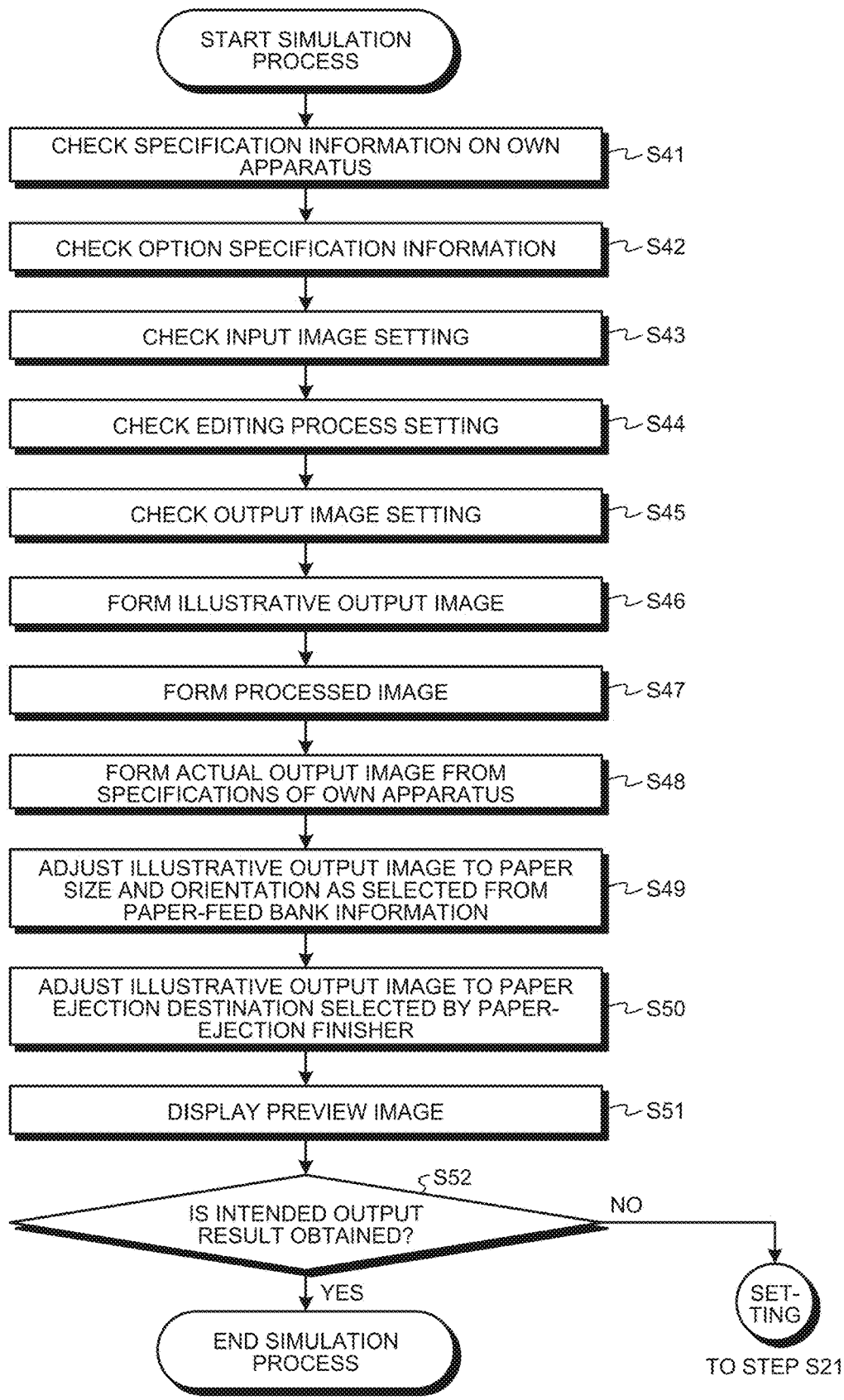
FIG. 8 is a flowchart illustrating the flow of detailed operation of the simulation process.

FIG. 8 is a flowchart illustrating the flow of detailed operation of the simulation process (the process at Step S30 in FIG. 7). If the process proceeds to the simulation process, the simulation processing unit 67 checks specifications of the own MFP on the basis of the specification information on the main body 21 of the MFP, where the specification information is acquired by the apparatus information acquiring unit 68 (Step S41). Further, the simulation processing unit 67 checks option specification information on the basis of exterior information and performance information on the optional apparatus, such as the paper-feed bank 22 or the finisher 23, where the exterior information and the performance information are acquired by the apparatus information acquiring unit 68 (Step S42).

Subsequently, the simulation processing unit 67 forms an illustrative output image on the basis of an input image obtained by input image setting (Step S43), an editing process performed by editing process setting (Step S44), and output setting performed by output image setting (Step S45) (Step S46). The illustrative image at this time is an image that is formed for an illustrative purpose inside the apparatus.

Further, if the optional apparatus performs a physical processing process, such as a punching process, a stapling process, or a folding process, on the output image, the simulation processing unit 67 forms an illustrative image to be obtained by the processing process (Step S47). Processing process information indicating the physical processing process as described above is included in the request content that is acquired by the request input processing unit 61.

Subsequently, the simulation processing unit 67 forms an actual output image corresponding to an image that is to be actually output, on the basis of the specification information on the own MFP (Step S48). The actual output image is an illustrative image in which color shade and color deviation of the image to be actually output are simulated, on the basis of a monochrome print function, a color print function, a type of toner, or the like in the own MFP.

Subsequently, the simulation processing unit 67 as one example of an output orientation detecting unit detects a paper size selected by the user and paper orientation at the time of output, on the basis of the paper-feed bank information on the paper-feed bank 22. The "paper orientation" indicates "orientation" that is determined based on, for example, a side to be output at a leading end at the time of output among a top side, a bottom side, a right longitudinal side, and a left longitudinal side of rectangular paper. The simulation processing unit 67 forms an illustrative image with the detected paper size and the detected orientation (Step S49).

Subsequently, the simulation processing unit 67 as one example of an output surface detecting unit detects an output surface of the paper on the basis of print mechanism information on the own MFP. In other words, the simulation processing unit 67 detects a "paper output surface" that indicates whether a printing surface (or a surface with an earlier page number) is output with face-up at the time of output (at the time of paper ejection) or the printing surface (or the surface with the earlier page number) is output with face-down, on the basis of information on each of a movement path of paper that has been fed, a printing surface, a paper ejection destination for ejecting printed paper, or the like. Then, the simulation processing unit 67 as one example of an output state image forming unit forms an illustrative image that indicates how the paper corresponding to the detected "paper output surface" is ejected from the paper ejection destination selected by the finisher 23 (Step S50). Accordingly, a preview image (a still image or a moving image) that represents an actual output state of the printed material to be output from the MFP is completed. The simulation processing unit 67 displays the completed preview image on the touch panel 31 (Step S51).

The user views the preview image displayed on the touch panel 31, and checks not only the illustrative image to be printed on the paper, but also the orientation, the way of printing, whether the printing surface (or the surface with the earlier page number) is printed with face- or face-down, and the paper ejection destination (Step S52: confirmation of the output state).

If the intended output state is not obtained (NO at Step S52), the user performs the resetting operation as described above at Step S21 in the flowchart in FIG. 7. If the intended output state is obtained (YES at Step S52), the simulation process is terminated. Then, a printed material output process is performed in response to an instruction from the user. Accordingly, the user is able to output the printed material in the intended output state.

Figure 9A:
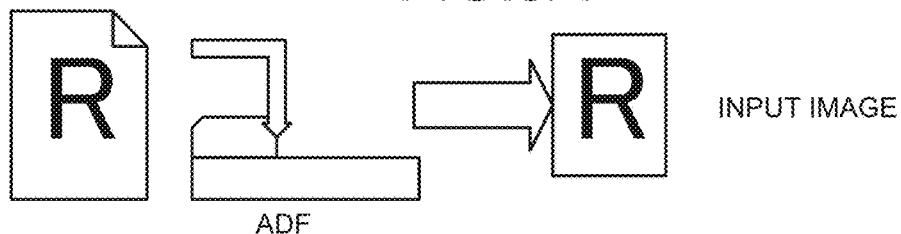
FIGS. 9A to 9F are schematic diagrams illustrating how a preview image is generated.

FIGS. 9A to 9F are schematic diagrams illustrating how the preview image is formed. FIG. 9A illustrates one example of an input image that is obtained by the input image setting as described above at Step S43. In the example in FIG. 9A, an ADF has read an image in which a large character of "R" is printed on the entire document. The image may be read as a monochrome image or may be read as a full-color image.

Figure 9B:
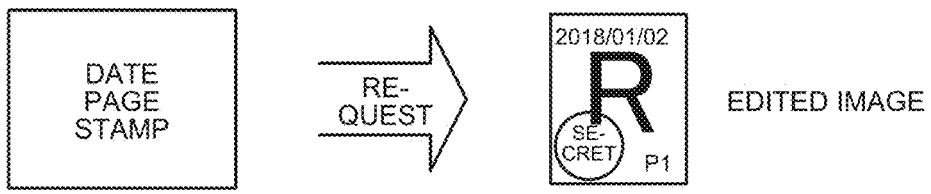

FIG. 9B illustrates one example of an edited image that is obtained by performing the editing process as described above at Step S44 on the input image. In the example in FIG. 9B, the user has issued a request to print, for example, a "date", a "page", and a "stamp" indicating confidential information, and they are printed on the input image. Specifically, FIG. 9B illustrates the example in which a date of "2018/01/02", a page number of "P1", and a stamp of circled text of "CONFIDENTIAL" indicating confidentiality are printed on the input image in which the character of "R" has been printed.

Figure 9C:
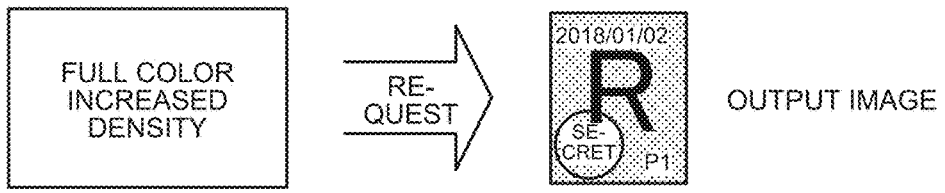

FIG. 9C illustrates one example of an output image that is obtained by performing the output image setting as described above at Step S45 on the input image. In the example in FIG. 9C, an output image that is obtained when the user issues a request for, for example, "full-color printing with increased density" is illustrated. In this case, an output image that is obtained by printing the above-described edited image in full color with increased density is formed.

Figure 9D:
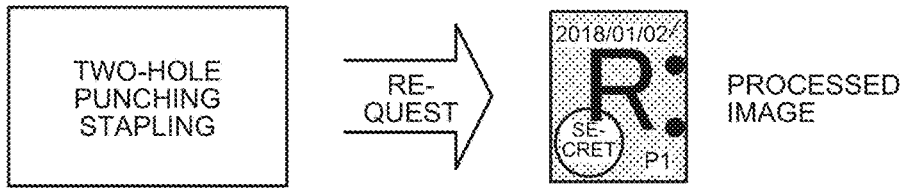

FIG. 9D illustrates one example of an output image that is obtained by performing the output image setting as described above at Step S47 on the output image. In the example in FIG. 9D, a processed image that is obtained when the user issues a request for two-hole punching process and a stapling process is illustrated. In this case, for example, a processed image in which two punched holes are formed along a right longitudinal side of rectangular paper and an upper right edge of the paper is stapled is formed.

Figure 9E:
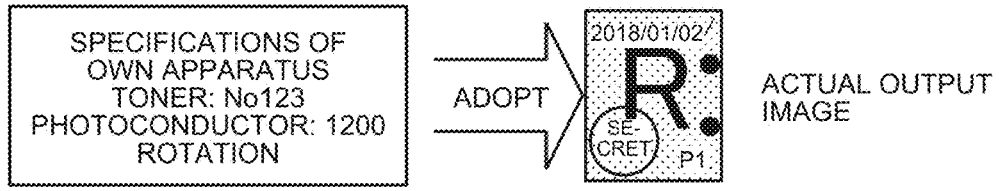

FIG. 9E illustrates one example of an actual output image that is formed based on the specification information on the own MFP as described above at Step S48. In the example in FIG. 9E, the own MFP has specifications for performing printing by using toner of "No123" and by rotating a photoconductor "1200 times". The simulation processing unit 67 forms the actual output image that is obtained when printing is performed with the specifications.

Figure 9F:
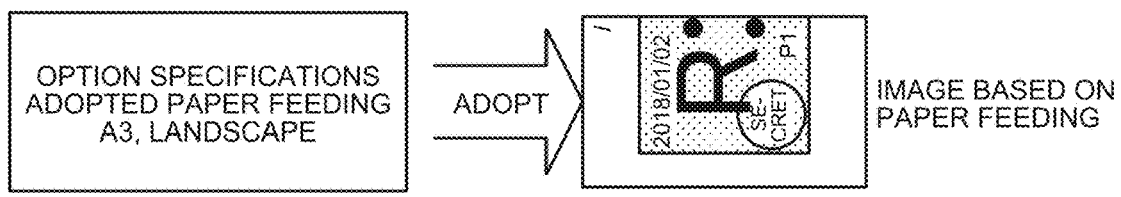

FIG. 9F illustrates one example in which a size and orientation of an illustrative output image are adjusted to the paper size and the orientation indicated by the paper-feed bank information as described above at Step S49. In the example in FIG. 9F, printing is performed using paper with A3 size and oriented in a landscape manner. In this example, because the paper is oriented in a landscape manner, an upper longitudinal side of the paper serves as the above-described right longitudinal side of the paper (see FIG. 9D). Therefore, an image in which two punched holes are formed along the upper longitudinal side of the paper and an upper left edge of the paper is stapled is formed.

Finally, as described above at Step S50, the simulation processing unit 67 detects the "paper output surface" that indicates whether a printing surface (or a surface with an earlier page number) is output with face-up at the time of output (at the time of paper ejection) or the printing surface (or the surface with the earlier page number) is output with face-down, on the basis of information on each of a movement path of paper that has been fed, a printing surface, a paper ejection destination for ejecting printed paper, or the like. Then, the simulation processing unit 67 forms an illustrative image that indicates how the paper corresponding to the detected "paper output surface" is ejected from the paper ejection destination selected by the finisher 23 (Step S50). Accordingly, a preview image (a still image or a moving image) that represents an output state of the printed material to be actually output from the MFP is formed and displayed on the touch panel 31.

Preview Image

Figure 10:
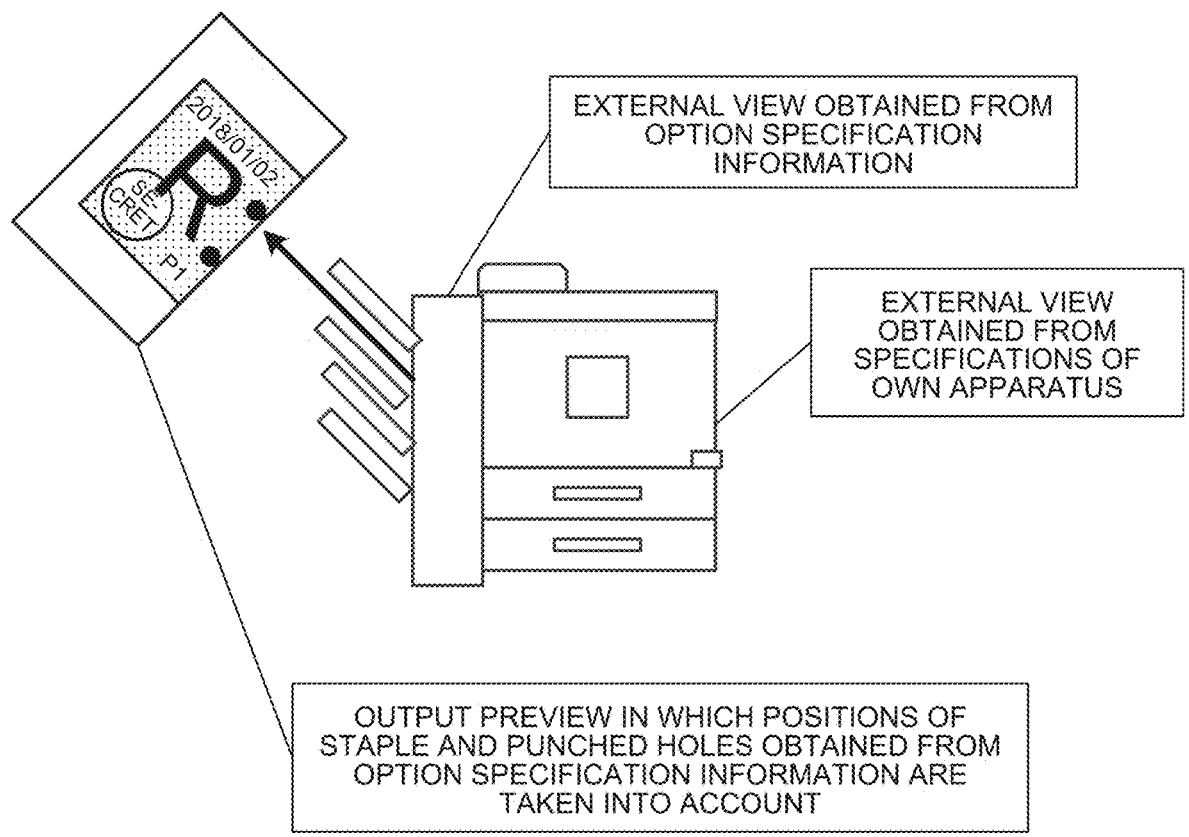
FIG. 10 is a diagram illustrating an example of the preview image.

FIG. 10 is a diagram illustrating an example of the preview image. As illustrated in FIG. 10, the simulation processing unit 67 acquires an external view of the MFP from the specification information on the own apparatus, and displays the view on the preview image. Further, the simulation processing unit 67 acquires external views of optional apparatuses, such as the paper-feed bank 22 and the finisher 23, mounted on the MFP from the option specification information, and displays the views on the preview image. Furthermore, the simulation processing unit 67 displays a printed material in which positions of punched holes and a position of a staple acquired from the option specification information are reflected (paper on which an image, a character, and the like are printed) on the preview image. Meanwhile, the simulation processing unit 67 forms and displays the preview image in which the orientation of the printed material (Step S49) and the surface (Step S50) are changed in accordance with the setting of the paper ejection destination and the output setting.

Effects of Embodiment

As can be seen from the above descriptions, the MFP according to the embodiment forms and displays a preview image in which a paper ejection process performed by the paper ejection unit is simulated on the basis of settings of the image input/output apparatus and the image editing apparatus, paper size information from the paper feed unit, the paper ejection process performed by the paper ejection unit, and information on the optional apparatuses, before outputting a printed material.

Specifically, the preview image in which the size and the orientation of an input image, setting of the image editing apparatus, setting for outputting an image, a size/orientation/output surface of paper from the paper feed unit corresponding to an output material, the processing process performed by the optional apparatuses, and the paper ejection destination are simulated is formed and displayed.

Therefore, a user is able to recognize an actual output state of a printed material in advance. Consequently, it is possible to output the printed material in a state as imagined by the user.

More specifically, various kinds of information as described below are used to form the preview image. For example, information indicating an input state for inputting an image, such as an input state using the pressure plate, an input state via the ADF, or an input state through a printer or an SD card. Further, input apparatus information and input setting information, such as a model number and performance of the pressure plate, direction/orientation/performance of the ADF, information indicating whether both sides are simultaneously read or automatically inverted in the case of duplex printing, and information whether an entire screen is arranged in a facing manner in the case of input from the SD card, are used.

Furthermore, editing operation setting information indicating a physical processing process, such as combining, page printing, stamping, book-binding, stapling, or punching, is used. Moreover, output apparatus information and output setting information, such as information on whether a printed material is formed to output an image, information on whether electronic data is formed, size/orientation/output surface of paper that is used to output a printed material, a type of the paper, a location of a bank in which the paper is stored, an electronic medium including a personal computer, a smartphone, and an SD card to which the electronic data is to be output, are used.

From the above-described information, the preview image of a still image or a moving image in which the output state of the printed material is simulated is formed and displayed. Accordingly, a user is able to determine whether the printed material is output as imagined by the user before the printed material is output. Therefore, it is possible to prevent unnecessary printing.

Each of the functions of the embodiment as described above may be implemented by one or more processing circuits. The "processing circuit" includes a processor that is programed so as to execute each of the functions by software like a processor that is implemented by an electron circuit, and includes a device, such as an application specific integrated circuit (ASIC), a digital signal processor (DSP), a field programmable gate array (FPGA), or a conventional circuit module, that is designed to execute each of the above-described functions.

According to an embodiment, it is possible to output a printed material as imagined by a user.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus configured to form and output a printed material obtained by printing image information on a printing medium, the image forming apparatus comprising:
    processing circuitry configured to
        acquire designation information for designating an output state of the image information, the designation information including specification information based on a main body of the image forming apparatus,
        detect an orientation in which the printed material is to be output,
        generate an output state image based on the detected orientation and the designation information, the output state image representing the orientation of the printed material being ejected from a paper ejection destination of the image forming apparatus, and the output state image including an image of an exterior of the image forming apparatus and an image of the printed material being ejected from the image forming apparatus, and
        display the output state image on a display.

2. The image forming apparatus according to claim 1, wherein the processing circuitry is further configured to,
    detect an output surface that is a top surface of the printed material when the printed material is output, and
    generate the output state image based on the detected orientation, the output surface, and the designation information.

3. The image forming apparatus according to claim 1, wherein
    the designation information includes additional print information to be printed on the printed material in addition to the image information, and
    the processing circuitry is configured to generate the output state image including the additional print information.

4. The image forming apparatus according to claim 1, wherein
    the designation information includes processing process information indicating a physical processing process to be performed on the printed material, and
    the processing circuitry is configured to generate the output state image including the physical processing process indicated by the processing process information.

5. The image forming apparatus according to claim 1, wherein the specification information includes option specification information based on exterior information and performance information of the image forming apparatus.

6. The image forming apparatus according to claim 1, wherein the output state image is a moving image.

7. An output state image generation method implemented by an image forming apparatus configured to form and output a printed material obtained by printing image information on a printing medium, the output state image generation method comprising:
    acquiring, by processing circuitry, designation information for designating an output state of the image information, the designation information including specification information based on a main body of the image forming apparatus;

detecting, by the processing circuitry, an orientation in which the printed material is to be output;

generating, by the processing circuitry, an output state image based on the detected orientation and the designation information, the output state image representing the orientation of the printed material being ejected from a paper ejection destination of the image forming apparatus, and the output state image including an image of an exterior of the image forming apparatus and an image of the printed material being ejected from the image forming apparatus; and displaying the output state image on a display.

8. A non-transitory computer-readable medium including programmed instructions that cause a computer of an image forming apparatus configured to form and output a printed material obtained by printing image information on a printing medium, the instructions causing the computer to execute a method comprising:

acquiring designation information for designating an output state of the image information, the designation information including specification information based on a main body of the image forming apparatus;

detecting an orientation in which the printed material is to be output;

generating an output state image based on the detected orientation and the designation information, the output state image representing the orientation of the printed material being ejected from a paper ejection destination of the image forming apparatus, and the output state image including an image of an exterior of the image forming apparatus and an image of the printed material being ejected from the image forming apparatus; and displaying the output state image on a display.

* * * * *